(12) United States Patent
Godfrey et al.

(10) Patent No.: US 7,647,165 B2
(45) Date of Patent: Jan. 12, 2010

(54) METHOD AND APPARATUS FOR VEHICLE TRACKING AND CONTROL

(76) Inventors: Timothy Gordon Godfrey, 12839 King St., Overland Park, KS (US) 66213; James Gerard Zyren, 225 Sea Crest Dr., Melbourne Beach, FL (US) 32951

( * ) Notice: Subject to any disclaimer, the term of this patent is extended or adjusted under 35 U.S.C. 154(b) by 612 days.

(21) Appl. No.: 10/861,066

(22) Filed: Jun. 4, 2004

(65) Prior Publication Data

US 2005/0071079 A1 Mar. 31, 2005

Related U.S. Application Data

(60) Provisional application No. 60/489,325, filed on Jul. 23, 2003.

(51) Int. Cl.
*G01C 21/00* (2006.01)

(52) U.S. Cl. ............... 701/207; 701/32; 701/200; 701/210; 701/213; 701/300; 340/988; 340/995.13; 340/995.19; 342/357.1

(58) Field of Classification Search ............... 701/32, 701/200, 207, 210, 213, 300; 340/988, 995.13, 340/995.19; 342/357.1
See application file for complete search history.

(56) References Cited

U.S. PATENT DOCUMENTS

| | | | | |
|---|---|---|---|---|
| 3,644,883 A | * | 2/1972 | Borman et al. ............... 340/991 |
| 4,742,357 A | * | 5/1988 | Rackley ....................... 342/457 |
| 5,870,018 A | * | 2/1999 | Person et al. ............... 340/5.65 |
| 6,236,337 B1 | * | 5/2001 | Beier et al. .................. 340/905 |
| 6,393,294 B1 | | 5/2002 | Perez-Breva et al. |
| 6,573,823 B1 | * | 6/2003 | Buytaert et al. ............. 340/5.27 |
| 7,536,415 B2 | * | 5/2009 | Miyahara ................. 707/104.1 |
| 2002/0040270 A1 | * | 4/2002 | Kwak et al. ................. 701/200 |
| 2002/0121975 A1 | * | 9/2002 | Struble et al. ............... 340/571 |
| 2002/0156571 A1 | * | 10/2002 | Curbow ...................... 701/207 |
| 2002/0186144 A1 | * | 12/2002 | Meunier ................. 340/825.28 |
| 2003/0093187 A1 | * | 5/2003 | Walker .......................... 701/1 |
| 2003/0139179 A1 | * | 7/2003 | Fuchs et al. ................. 455/426 |
| 2006/0015220 A1 | * | 1/2006 | Matsuo .......................... 701/2 |

* cited by examiner

*Primary Examiner*—Khoi Tran
*Assistant Examiner*—Jonathan Sample
(74) *Attorney, Agent, or Firm*—McDonnell Boehnen Hulbert & Berghoff LLP

(57) ABSTRACT

A method and apparatus are disclosed for improving vehicle tracking and remote control. A wireless telecommunications system infrastructure receives a unique vehicle identifier via a shared-communications channel from a vehicle being tracked, as well as location information for that vehicle. The location information is derived from Global Positioning System signals or from the address of the local infrastructure currently in contact with the vehicle, or both. The same shared-communications channel is used to convey control messages to the vehicle, wherein the messages are mapped into control signals that can disable the vehicle's engine or control some other system that is part of the vehicle.

27 Claims, 8 Drawing Sheets ized communications protocols (or "rules") and assigned electromagnetic
METHOD AND APPARATUS FOR VEHICLE TRACKING AND CONTROL

CROSS-REFERENCE TO RELATED APPLICATIONS

This application claims the benefit of U.S. Provisional Patent Application Ser. No. 60/489,325, entitled "Stolen Vehicle Tracking Using Dedicated Short Range Communication (DSRC)," filed on Jul. 23, 2003, which is incorporated by reference.

FIELD OF THE INVENTION

The present invention relates to telecommunications in general, and, more particularly, to motor vehicle tracking and control.

BACKGROUND OF THE INVENTION

FIG. 1 depicts vehicle 101, vehicle transceiver 102, and vehicle tracking infrastructure in the prior art. Vehicle 101 is a conveyance for people or things or both. Examples of vehicle 101 include cars, buses, trucks, etc.

Vehicle transceiver 102 is a telecommunications device that is present in vehicle 101. Vehicle transceiver 102 comprises a transmitter part and a receiver part. In addition to supporting other services (e.g., unlocking a car, etc.), vehicle transceiver 102 is used to provide a signal with which to determine the location of vehicle 101. A particular situation in which vehicle transceiver 102 is used is when vehicle 101 has been stolen.

Vehicle tracking infrastructure 103 receives signals wirelessly from vehicle transceiver 102. Using the received signals, vehicle tracking infrastructure 103 determines and tracks the location of vehicle 101. One or more radio-equipped base stations that constitute vehicle tracking infrastructure 103 receive signals from vehicle transceiver 102 after the transmitter part in vehicle transceiver 102 has been activated. In some cases, vehicle tracking infrastructure 103 transmits signals to vehicle transceiver 102 to activate the transmitter part.

Various stolen vehicle tracking systems exist in the prior art and can be grouped into two categories. The first category comprises proprietary tracking networks. The second category comprises cellular-based tracking networks. In some cases, the tracking networks have a Global Positioning System (or "GPS") capability described below. An exemplary tracking system from each of the two categories is now described.

Lojack, a registered trademark of Lojack Corporation, Dedham, Mass., is a system that belongs to the proprietary category. Lojack enables police departments that are equipped with proprietary tracking computers to monitor the location of a vehicle, typically one that is stolen. A transceiver hidden within the vehicle is activated by a radio signal when the vehicle owner reports the vehicle to the police as being stolen. The transmitter part of the transceiver then emits a tracking signal that is monitored.

A disadvantage of proprietary-based tracking systems is that proprietary equipment costs are typically more than that of non-proprietary, standardized equipment. Also, proprietary tracking systems are not ubiquitously deployed and are often found mainly in major metropolitan areas where deployment is more cost-effective than in sparsely-populated areas.

OnStar, a registered trademark of General Motors, Detroit, Mich., is a system that belongs to the cellular category. The OnStar automobile navigation system uses cellular phone technology to send tracking information from a vehicle transceiver to the OnStar monitoring center that supports the vehicle. The vehicle transceiver contains a GPS receiver that continually obtains information from GPS satellites in orbit around the earth. These satellites transmit information which, when received and processed, provides the geographic location of the unit receiving the signals. The transmitter part of the vehicle transceiver transmits the GPS information to the monitoring center to determine the vehicle's position.

A disadvantage of the cellular-based tracking system is that it relies largely on cellular networks, which are optimized mainly for voice services. In tracking systems that use cellular networks, for each message transmitted, each connection between the vehicle transceiver and a base station serving the transceiver uses a frequency channel for an extended period of time. Although this type of network is acceptable for voice calls that use a channel for at least a few minutes at a time, it is suboptimal for handling relatively infrequent GPS messages at lower information rates. Another disadvantage is that the GPS signals from satellites cannot be received in certain environments such as indoor parking garages and tunnels.

What is needed is a vehicle tracking system without some of the costs and disadvantages in the prior art.

SUMMARY OF THE INVENTION

The present invention is a system that improves the tracking of a vehicle without some of the costs and disadvantages in the prior art. The illustrative embodiment of the present invention achieves the improvement by using Dedicated Short Range Communications (DSRC). DSRC is a wireless network system that comprises its own standardized communications protocols (or "rules") and assigned electromagnetic frequency spectrum. In accordance with the illustrative embodiment, a vehicle communicates its unique vehicle identifier and location to a vehicle tracking server via a shared-communications channel that is part of the DSRC infrastructure.

One of the communication modes that DSRC supports uses a fixed, roadside hub to communicate with one or more vehicles through each vehicle's on-board unit. The roadside hub is essentially an access point, a term used in Institute of Electrical and Electronics Engineers (IEEE) 802.11-based systems, and will be referred to as such in this disclosure. The on-board unit is essentially a communications station, another a term used in IEEE 802.11-based systems, and will be referred to as such in this disclosure. The IEEE 802.11 standard defines a set of protocols that govern how a wireless local area network (also known as "LAN") operates.

In the United States, DSRC systems operate in the 5.850 Gigahertz to 5.925 Gigahertz electromagnetic frequency band. Furthermore, DSRC systems use the IEEE 802.2 logical link control layer protocol, as well as medium access control layer and physical layer protocols adapted from existing protocols, such as IEEE 802.11a, which operates in the 5 Gigahertz band. The logical link control, medium access control, and physical layer protocols are used in data communications to provide a common access control and transmission standard for use with a shared-communications channel.

Outside the United States, a system that is similar to Dedicated Short Range Communications is being defined by the International Organization for Standardization. This system is designated ISO TC204/WG16. In this specification, the term "Dedicated Short Range Communications" or "DSRC" will be used to refer to both the U.S. system and the ISO TC204/WG16-based system.

The DSRC-based infrastructure in the illustrative embodiment offers an improvement over proprietary-based tracking systems by using standardized equipment (e.g., IEEE 802.11a-based transceivers, etc.) that historically cost less to make and use than proprietary equipment. In addition, DSRC-based infrastructure is expected to be widely deployed over the next few years, making systems that incorporate the illustrative embodiment available in many geographic areas.

The DSRC-based infrastructure in the illustrative embodiment offers an improvement over cellular-based tracking systems in that all communications stations in a given coverage area share a communications channel, similar to the shared-communications channel that is used in a wireless local area network. This allows service providers to cost-effectively offer the tracking service by itself, as opposed to having to bundle the tracking service along with voice-related services to justify the higher cost structure of a cellular-based tracking system. Furthermore, the coverage footprint of each DSRC access point will tend to be smaller than each "cell" in a cellular network, which improves the localizing of a vehicle when GPS signals are unreliable.

In accordance with the illustrative embodiment of the present invention, during the communications session, the communications station transmits a unique vehicle identifier to the service provider's server. In some embodiments, the station uses an encrypted session in which to transmit the identifier. The service provider checks the unique vehicle identifier against a set of vehicles, such as a list. If there is a match, the service provider reports the location of the vehicle to law enforcement officials, the owner of the vehicle, or other interested parties.

The communications station, in other embodiments, also accepts control messages and uses those messages to control the vehicle. For example, the service provider can transmit control messages to the communications station to stop or affect operation of the vehicle's engine, honk the horn, turn the headlights on, or activate on-board audio or video for monitoring purposes. Controlling the vehicle in this way can help track the vehicle and, if needed, to help recover the vehicle.

An illustrative embodiment of the present invention comprises: (a) receiving a unique vehicle identifier and a location from a wireless communications station, wherein the wireless communications station transmits the unique vehicle identifier and the location via a shared-communications channel of a Dedicated Short Range Communications infrastructure; and (b) notifying a user of the location when the unique vehicle identifier belongs to a non-empty set of vehicle identifiers.

DETAILED DESCRIPTION

For the purposes of this disclosure, the term Dedicated Short Range Communications (DSRC) refers to a wireless network system that comprises its own standardized communications protocols and assigned electromagnetic frequency spectrum, wherein the system is primarily intended to support public-safety and private operations in roadside-to-vehicle and vehicle-to-vehicle environments for the transportation industry. DSRC can be viewed as a complement to cellular telecommunications, in that DSRC provides relatively high data transfer rates (i.e., in relation to cellular) in circumstances where minimizing latency in the communication link and isolating relatively small communication zones are important.

The terms access point and communications station are defined here. For the purposes of this disclosure, the term access point refers to a Dedicated Short Range Communications roadside hub that is used to communicate with one or more vehicles through each vehicle's on-board unit. Also for the purposes of this disclosure, the term communications station refers to a Dedicated Short Range Communications on-board unit that enables a vehicle to communicate with the rest of the network. It will be clear to those skilled in the art, after reading this specification, that an access point and a communications station can also be used in networks other than Dedicated Short Range Communications networks (e.g., IEEE 802.11g, etc.).

For the purposes of this disclosure, the term user refers to an organization or person that uses telecommunications system 200 for the purpose of finding, tracking, or controlling—alone or in combination—a particular vehicle, such as vehicle 101. Examples of the user include the operator of a vehicle tracking service, a law enforcement agency, the owner or operator of vehicle 101, etc.

Figure 1:
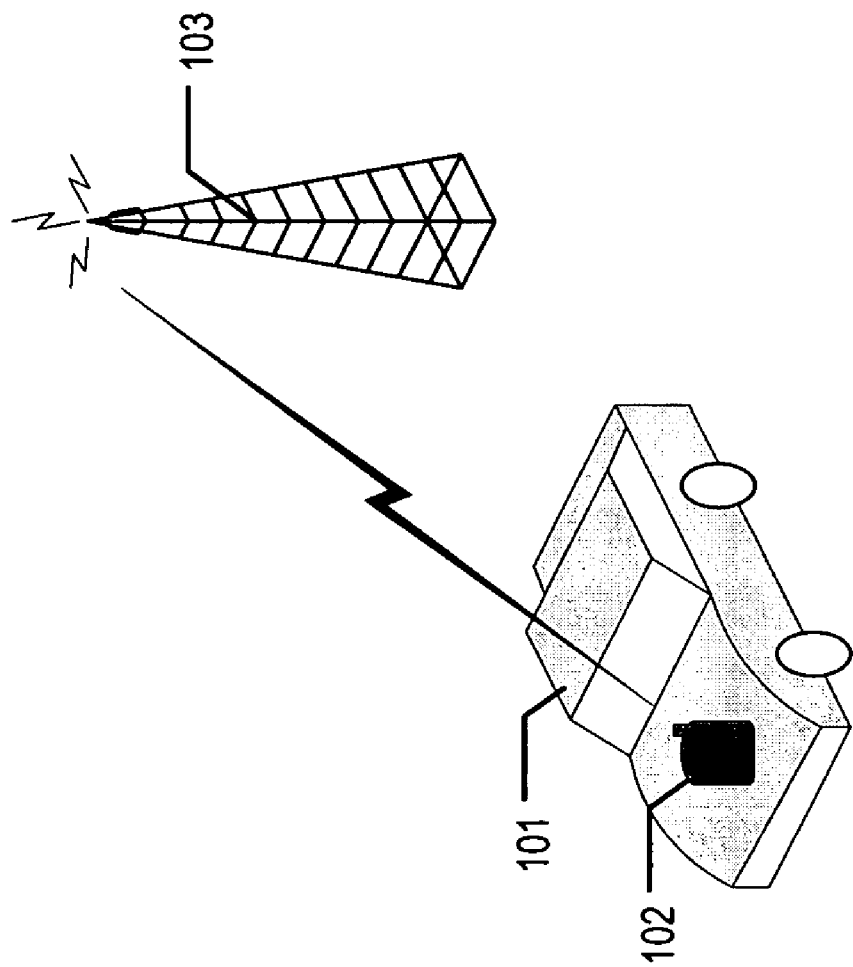
FIG. 1 depicts vehicle 101 equipped with vehicle transceiver unit 102 in the prior art.
Figure 2:
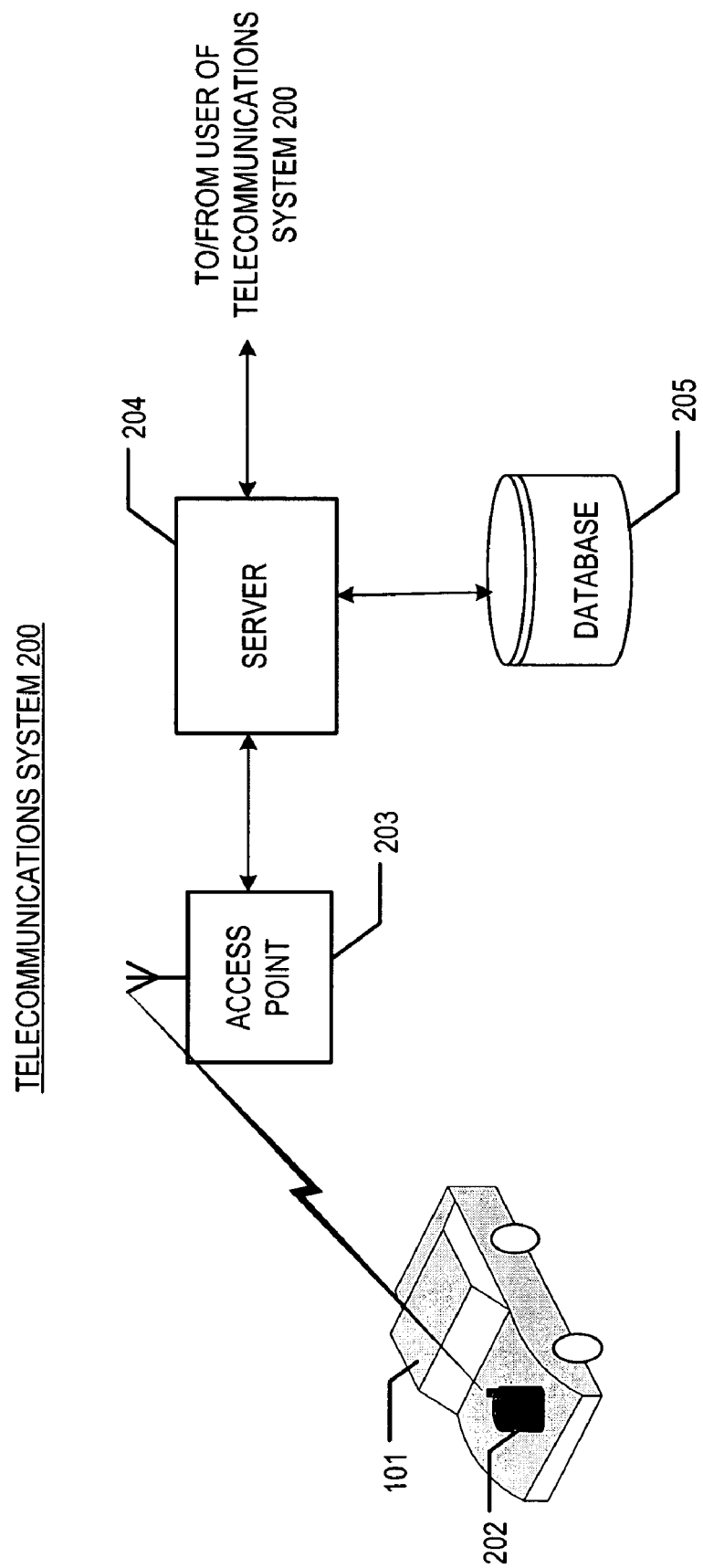
FIG. 2 depicts the salient components of telecommunications system 200, in accordance with the illustrative embodiment of the present invention.

FIG. 2 depicts the salient components of telecommunications system 200 in accordance with the illustrative embodiment of the present invention. As shown in FIG. 2, telecommunications system 200 comprises communications station 202, access point 203, server 204, and database 205, interconnected as shown.

Vehicle 101 is a conveyance of people or things or both. For example, vehicle 101 can be a motor vehicle such as a car, truck, or bus. It will be clear to those skilled in the art how to make and use vehicle 101.

Communications station 202 (or "station 202") wirelessly transmits signals to and receives signals from access point 203 in well-known fashion. Station 202 is situated in vehicle 101, in accordance with the illustrative embodiment of the present invention. As will be appreciated by those skilled in the art, in some embodiments station 202 operates in accordance with a protocol that is based on a local area network protocol (e.g., IEEE 802.11a, etc.), while in other embodiments station 202 operates in accordance with a protocol that is based on a metropolitan-area network protocol (e.g., IEEE 802.16 ["Wi-Max"], etc.). It will be clear to those skilled in the art, after reading this disclosure, how to make and use station 202.

Although a single communications station is depicted in FIG. 2, it will be clear to those skilled in the art, after reading this disclosure, how to make and use telecommunications system 200 to handle multiple communications stations simultaneously.

It will also be clear to those skilled in the art, after reading this disclosure, how to make and use telecommunications system 200 with more than one access point that is connected to and communicate with server 204, or to a collection of servers that provide the functionality described in this disclosure for server 204.

Access point 203 wirelessly transmits signals to and receives signals from station 202, and possibly other communications stations by using Dedicated Short Range Communications infrastructure, in well-known fashion. As will be appreciated by those skilled in the art, in some embodiments access point 203 operates in accordance with a protocol that is based on a local area network protocol (e.g., IEEE 802.11a, etc.), while in other embodiments access point 203 operates in accordance with a protocol that is based on a metropolitan-area network protocol (e.g., IEEE 802.16 ["Wi-Max"], etc.). It will be clear to those skilled in the art, after reading this disclosure, how to make and use access point 203.

Server 204 is a computer that receives requests from client devices and performs one or more computing tasks in response to these requests, as is known in the art. As shown in FIG. 2, server 204 sends signals to and receives signals from access point 203 and database 205, in well-known fashion. For example, server 204 might communicate with access point 203 via the Internet, and server 204 might communicate with database 205 via a fibre channel interface, as are known in the art. It will be clear to those skilled in the art, after reading this disclosure, how to make and use server 204.

Database 205 stores information for a plurality of users and for a plurality of communications stations, where the information indicates vehicles that have been highlighted for various reasons. For example, vehicle 101 might be a stolen vehicle and the owner of vehicle 101 has requested that vehicle 101 be placed on a stolen vehicles list that is maintained in database 205. In addition, database 205 stores, in some embodiments, location information on station 202 and, inferentially, of vehicle 101. The location information can comprise the current location or history of previous locations. The history, together with the current location, can be used to extrapolate vehicle 101's velocity or, at least, its direction of travel.

Figure 3:
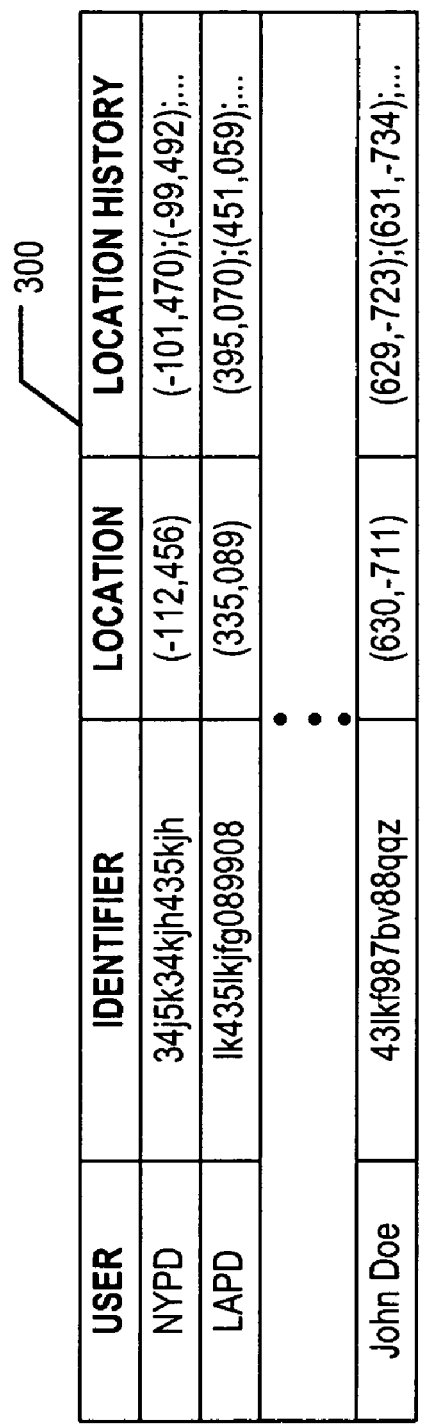
FIG. 3 depicts an exemplary organization of information in database 205, in accordance with the illustrative embodiment of the present invention.

FIG. 3 depicts an exemplary organization of information in database 205 in accordance with the illustrative embodiment of the present invention. Vehicle list 300 stores the user name, unique vehicle identifier, current geo-location, and past geo-locations of each vehicle being tracked (e.g., vehicle 101, etc.).

The user name can be an agency's name (e.g., New York Police Department, etc.), a person's name (e.g., John Doe, etc.), or some other name with which to associate a vehicle being tracked. The unique vehicle identifier tags the particular vehicle being tracked. In some embodiments, the unique vehicle identifier is based on the Vehicle Identification Number (VIN), as is known in the art.

The location information (i.e., current and past geo-location) is the location of the communications station of the vehicle being tracked and, inferentially, the location of the vehicle. In the illustrative embodiment, the geo-location of a vehicle is represented in two-dimensional Cartesian coordinates (i.e., (x, y)). As will be appreciated by those skilled in the art, in some embodiments geo-locations might be stored differently (e.g., latitude/longitude, three-dimensional Cartesian coordinates, latitude/longitude/elevation, etc.).

Figure 4:
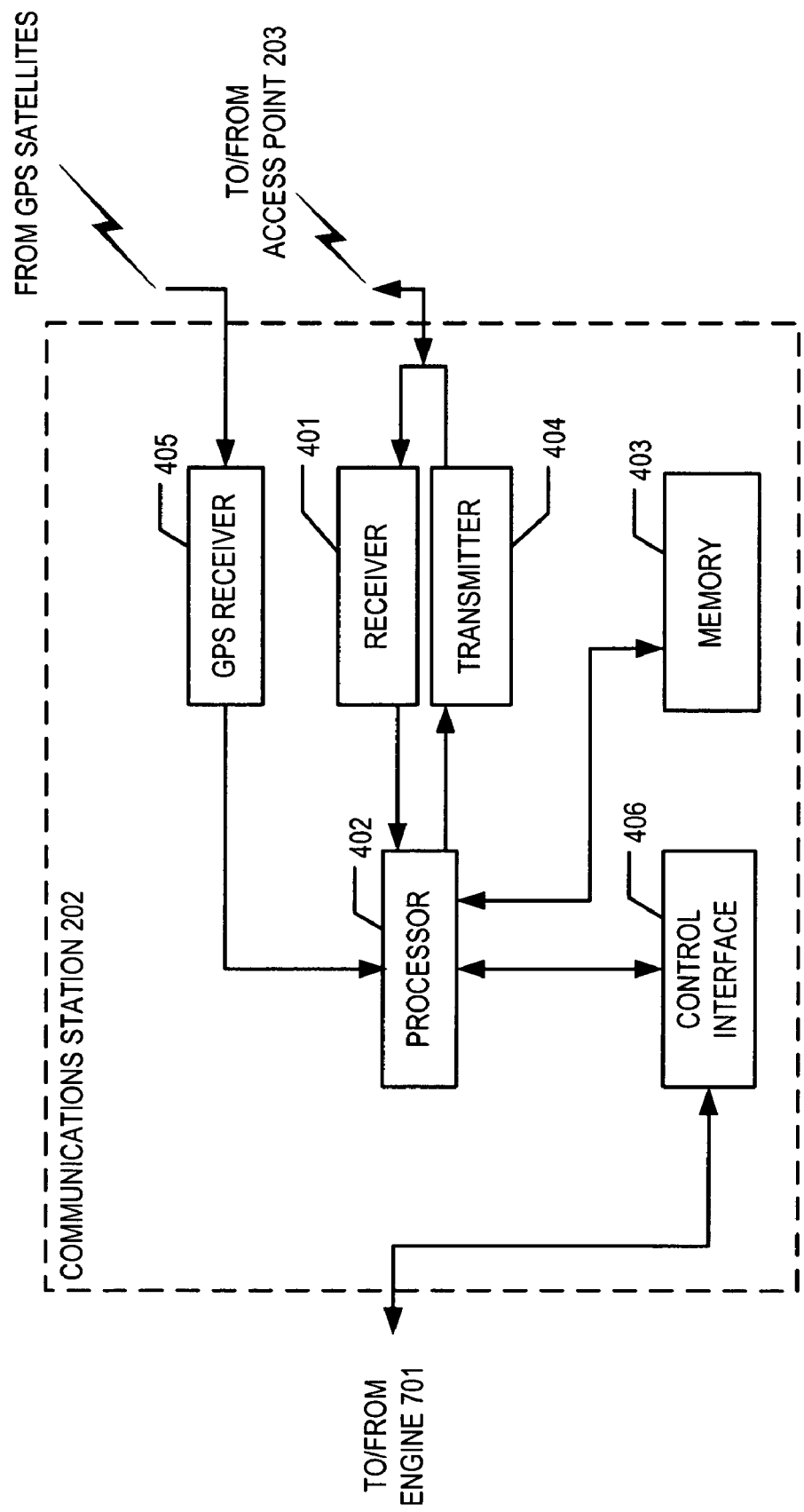
FIG. 4 depicts a block diagram of the salient components of communications station 202, in accordance with the illustrative embodiment of the present invention.

FIG. 4 depicts a block diagram of the salient components of station 202 in accordance with the illustrative embodiment of the present invention. As shown in FIG. 4, station 202 comprises receiver 401, processor 402, memory 403, transmitter 404, GPS receiver 405, and control interface 406, interconnected as shown.

Receiver 401 receives signals wirelessly from access point 203 and forwards the information encoded in these signals to processor 402, in well-known fashion. It will be clear to those skilled in the art, after reading this disclosure, how to make and use receiver 401.

Processor 402 is a general-purpose processor that is capable of executing instructions stored in memory 403, of reading data from and writing data into memory 403, of receiving geo-location information from Global Positioning System (GPS) receiver 405, of receiving information from receiver 401, of transferring information to transmitter 404, and of executing the tasks described below and with respect to FIG. 8. In some alternative embodiments of the present invention, processor 402 might be a special-purpose processor. In either case, it will be clear to those skilled in the art, after reading this disclosure, how to make and use processor 402.

Memory 403 stores data and executable instructions, as is well-known in the art, and might be any combination of random-access memory (RAM), flash memory, disk drive, etc. It will be clear to those skilled in the art, after reading this disclosure, how to make and use memory 403.

Transmitter 404 receives information from processor 402 and wirelessly transmits signals that encode this information to access point 203, in well-known fashion. In some embodiments, transmitter 404 continually receives updated geo-location information from processor 402 and transmits this information to access point 203. It will be clear to those skilled in the art, after reading this disclosure, how to make and use transmitter 404.

Global Positioning System (GPS) receiver 405 receives satellite-based signals and determines geo-location, as is known in the art, and forwards the geo-location to processor 402. It will be clear to those skilled in the art that some embodiments might employ means other than satellite-based signals for determining geo-location (e.g., triangulation, radio beacons, radio-frequency fingerprinting [U.S. Pat. No. 6,393,294, incorporated by reference], etc.) In such embodiments, an appropriate receiver (e.g., radio-frequency receiver, etc.) would be substituted for GPS receiver 405, as is known in the art.

In certain situations, GPS signals might be unavailable. Some examples are an indoor parking garage or a tunnel. In these environments, Dedicated Short Range Communications (DSRC) access points can be readily deployed. In these situations as well as others, the geo-location can be represented by the medium access controller (MAC) address of the infrastructure (i.e., the access point) to which the vehicle is connected. In some embodiments, both GPS-based location information and medium access controller-based geo-location information can be forwarded to processor 402 and, subsequently, to server 204.

Control interface 406 receives signals from processor 402 and transmits corresponding output signals to engine 701, as will be described below and with respect to FIG. 7. It will be clear to those skilled in the art, after reading this disclosure, how to make and use control interface 406.

Figure 5:
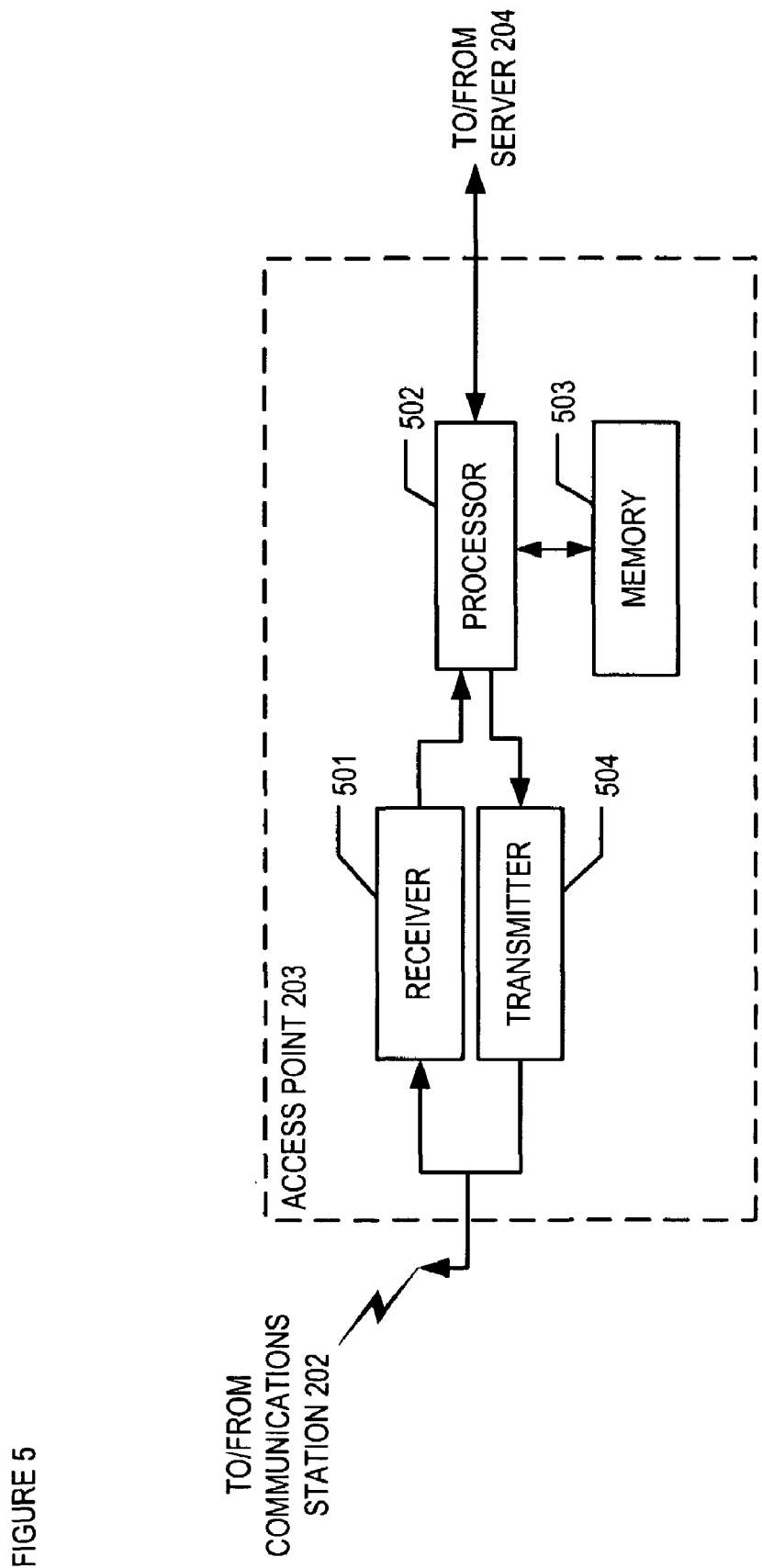
FIG. 5 depicts a block diagram of the salient components of access point 203, in accordance with the illustrative embodiment of the present invention.

FIG. 5 depicts a block diagram of the salient components of access point 203 in accordance with the illustrative embodiment of the present invention. As shown in FIG. 5, access point 203 comprises receiver 501, processor 502, memory 503, and transmitter 504, interconnected as shown.

Receiver 501 receives signals wirelessly from station 202, and possibly other communications stations, and forwards the information encoded in these signals to processor 502, in well-known fashion. It will be clear to those skilled in the art, after reading this disclosure, how to make and use receiver 501.

Processor 502 is a general-purpose processor that is capable of executing instructions stored in memory 503, of reading data from and writing data into memory 503, of forwarding information received from station 202 (via receiver 501) to server 204, of receiving information from server 204, and of forwarding (via transmitter 504) information received from server 204 to station 202. In some alternative embodiments of the present invention, processor 502 might be a special-purpose processor. In either case, it will be clear to those skilled in the art, after reading this disclosure, how to make and use processor 502.

Memory 503 stores data and executable instructions, as is well-known in the art, and might be any combination of random-access memory (RAM), flash memory, disk drive, etc. It will be clear to those skilled in the art, after reading this disclosure, how to make and use memory 503.

Transmitter 504 receives information from processor 502 and wirelessly transmits signals that encode this information to station 202, in well-known fashion. It will be clear to those skilled in the art, after reading this disclosure, how to make and use transmitter 504.

Figure 6:
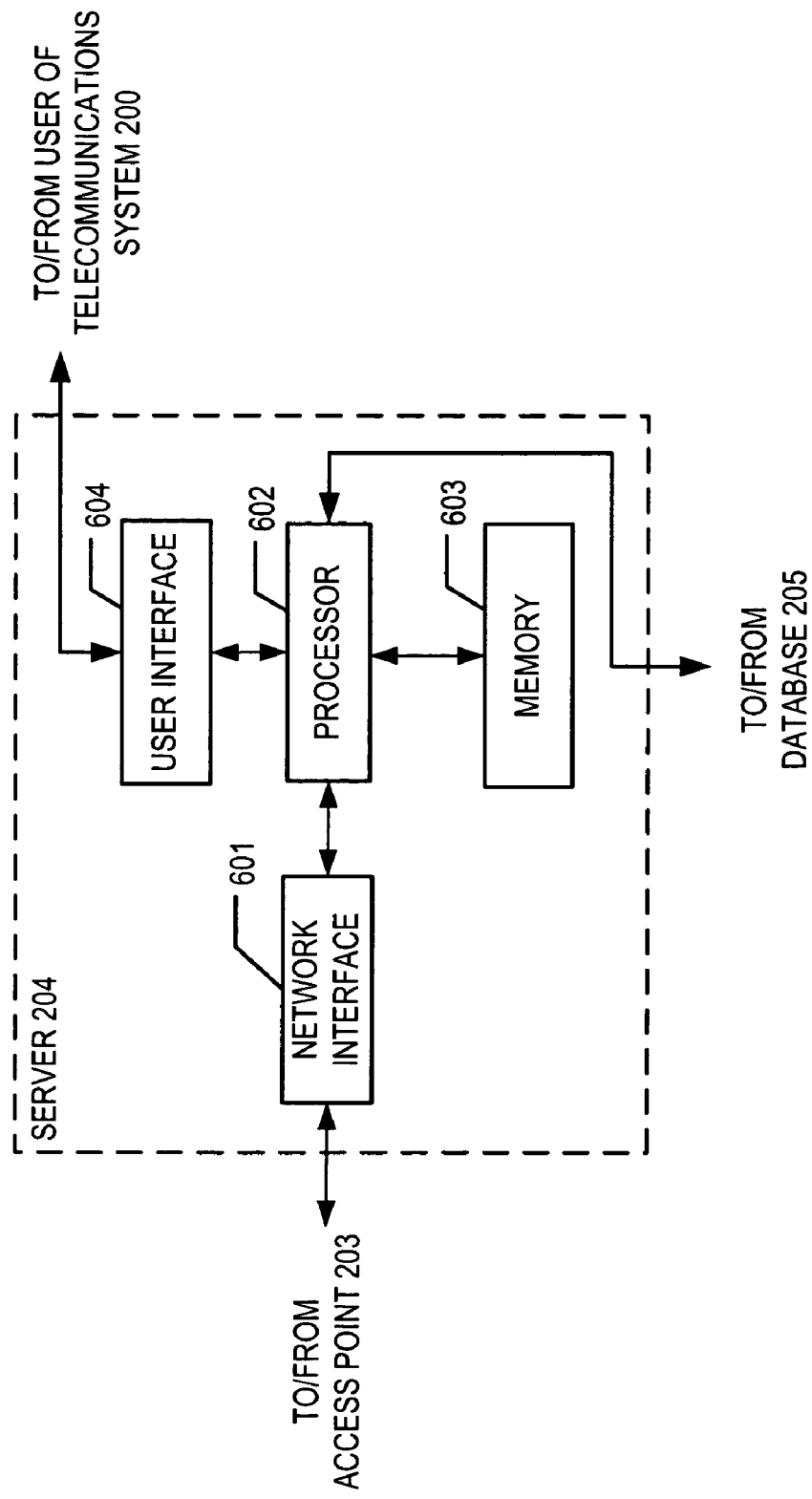
FIG. 6 depicts a block diagram of the salient components of server 204, in accordance with the illustrative embodiment of the present invention.

FIG. 6 depicts a block diagram of the salient components of server 204 in accordance with the illustrative embodiment of the present invention. As shown in FIG. 6, server 204 comprises network interface 601, processor 602, memory 603, and user interface 604, interconnected as shown.

Network interface 601 also receives information from access point 203 and forwards this information to processor 602, in well-known fashion. Network interface 601 also receives information from processor 602 and forwards this information to access point 203, in well-known fashion. It will be clear to those skilled in the art, after reading this disclosure, how to make and use network interface 601.

Processor 602 is a general-purpose processor that is capable of executing instructions stored in memory 603, of reading data from and writing data into memory 603, of transferring information to and from access point 203, of exchanging information with the user of telecommunications system 200, and of executing the tasks described below and with respect to FIG. 8.

Processor 602 receives the unique vehicle identifier from station 202 via access point 203 and compares the identifier with the list of those stored in database 205. The list of vehicle identifiers stored in database 205 is built with input from one or more users of telecommunications system 200. For example, if a vehicle 101 is stolen, the owner of vehicle 101 calls a customer support person to report the crime. The customer support person then enters the vehicle identifier of vehicle 101 into the list stored in database 205 along with the owner's name, the local law enforcement agency's name, or both.

Also, processor 602 receives geo-location information that corresponds to vehicle 101 from station 202 and via access point 203. As will be appreciated by those skilled in the art, processor 602 might perform some computations (e.g., transforming latitude/longitude to Cartesian coordinates, etc.). Processor 602 then transmits the geo-location-related information to the user of telecommunications system 200.

In some alternative embodiments of the present invention, processor 602 might be a special-purpose processor instead of a general-purpose processor. In either case, it will be clear to those skilled in the art, after reading this disclosure, how to make and use processor 602.

Memory 603 stores data and executable instructions, as is well-known in the art, and might be any combination of random-access memory (RAM), flash memory, disk drive, etc. It will be clear to those skilled in the art, after reading this disclosure, how to make and use memory 603.

User interface 604 (i) receives input signals from the user of telecommunications system 200 and forwards corresponding signals to processor 602, and (ii) receives signals from processor 602 and emits corresponding output signals that can be sensed by the user, in well-known fashion. As will be appreciated by those skilled in the art, the input mechanism of user interface 604 might be a keypad, touch screen, microphone, an electrical signal path from another device, etc., and the output mechanism of user interface 604 might be a liquid-crystal display (LCD), speaker, an electrical signal path to another device, etc. It will be clear to those skilled in the art, after reading this disclosure, how to make and use user interface 604.

Figure 7:
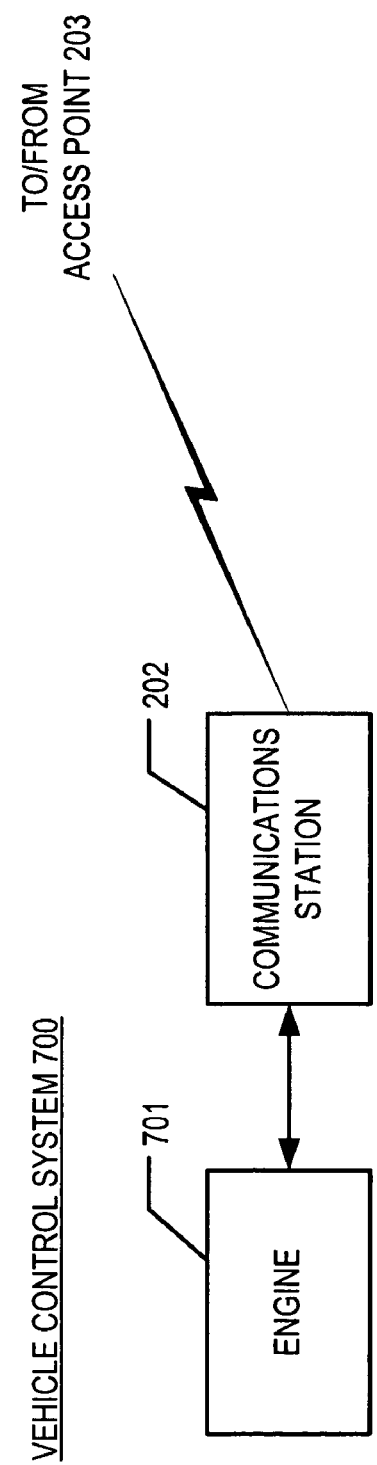
FIG. 7 depicts a block diagram of the salient components of vehicle control system 700, in accordance with the illustrative embodiment of the present invention.

FIG. 7 depicts a block diagram of the salient components of vehicle control system 700, in accordance with the illustrative embodiment of the present invention. As depicted in FIG. 7, vehicle control system 700 comprises station 202 and engine 701, interconnected as shown.

Engine 701 propels vehicle 101 in well-known fashion. For example, engine 701 can be an internal combustion engine, an electric motor, a hybrid gasoline engine/electric motor, etc. It will be clear to those skilled in the art how to make and use engine 701.

Station 202, in some embodiments, controls engine 701 in a variety of ways. Control can mean disabling engine 701 and, therefore, vehicle 101. Control can also mean adjusting the revolutions per minute (RPM) of engine 701.

To control engine 701, station 202 transmits signals to engine 701 in well-known fashion. Upon receiving a control message from access point 203, station 202 transmits a signal electrically to the ignition system of engine 701, an internal combustion engine as an example, to prevent electrical current from passing through the spark plugs. For example, a relay device can be opened by the transmitted signal, thereby stopping the current flow through the spark plugs.

Station 202, in some embodiments, controls systems other than engine 701 that are associated with vehicle 101, in well-known fashion. Similarly, station 202 can transmit a signal electrically to honk the horn, turn the headlights on, or activate on-board audio or video surveillance.

Figure 8:
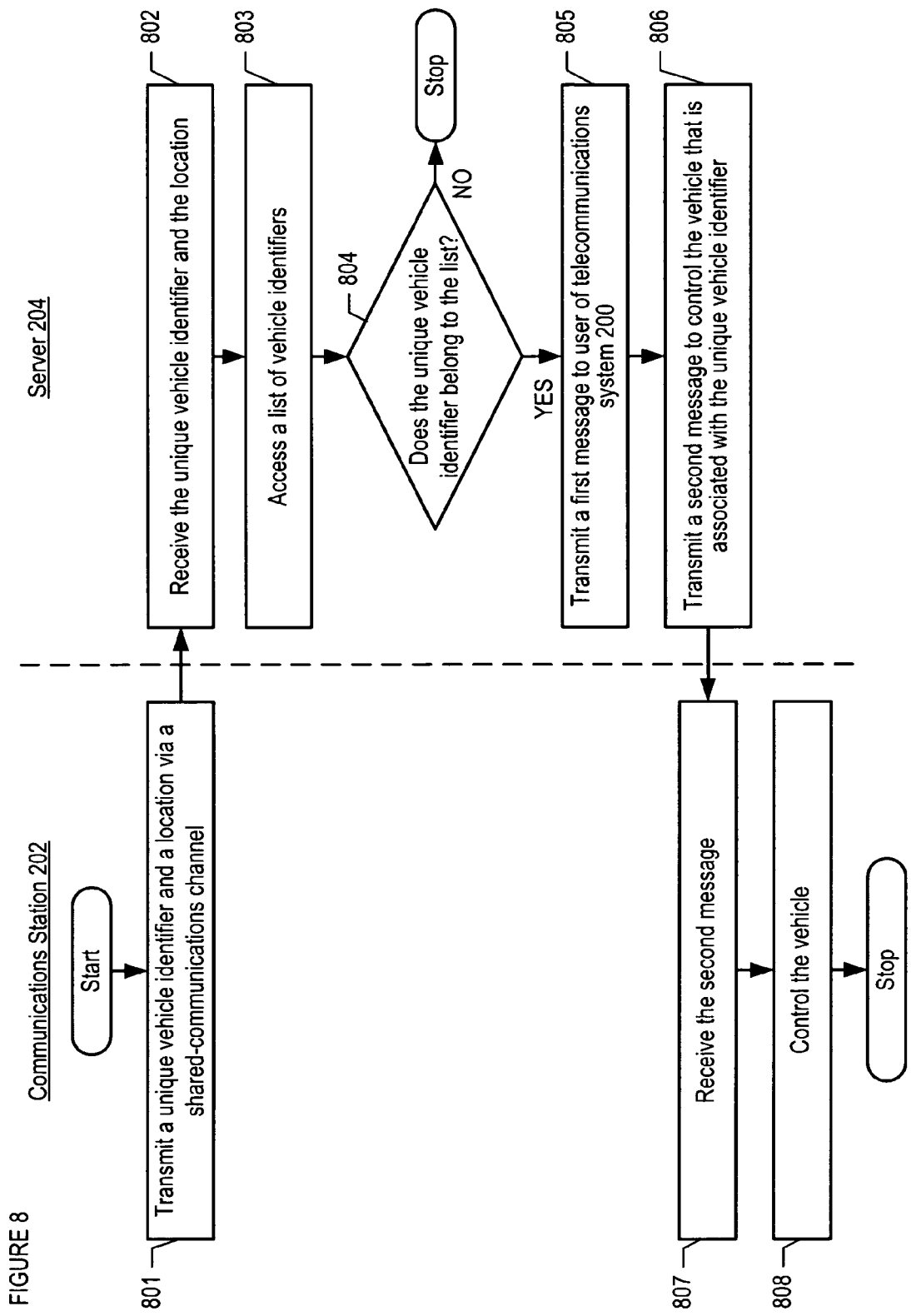
FIG. 8 depicts a flowchart of the operation of communications station 202 and server 304, in accordance with the illustrative embodiment of the present invention.

FIG. 8 depicts the operation of station 202 and server 204, in accordance with the illustrative embodiment of the present invention. It will be clear to those skilled in the art which tasks depicted in FIG. 8 can be performed simultaneously or in a different order than that depicted.

At task 801, station 202 initiates a communication session with server 204 when station 202 is within communication range of access point 203. Station 202 transmits a unique vehicle identifier and a location via a shared-communications channel in well-known fashion. The unique vehicle identifier is able to identify vehicle 101 unambiguously, at least within a specific geographic area (e.g., North America, the coverage area served by telecommunications system 200, etc.). Station 202, in accordance with the illustrative embodiment, uses a randomized medium access control address for privacy reasons as its unique vehicle identifier. It is well-known in the art how to assign to station 202 a randomized address. In some embodiments, at least a portion of the unique vehicle identifier is based on vehicle 101's Vehicle Identification Number, or "VIN," as is known in the art.

Station 202, in some embodiments, communicates its unique vehicle identifier using an encrypted session, as is well-known in the art.

Station 202, in accordance with the illustrative embodiment, also transmits its location to server 204 via access point 203. The location transmitted is the current location of station 202. In accordance with the illustrative embodiment, the location is based on the GPS coordinates. In other embodiments, current location can be based on the access point with which communications server 202 is currently associated, as is known in the art. For example, vehicle 101 might be in a parking garage that a GPS signal cannot penetrate, but that is served by a Dedicated Short Range Communications system.

The timing as to when station 202 transmits the identifier and location is based on a variety of conditions, including one or more of the following:
  i. when station 202 crosses into a coverage area served by another access point;
  ii. whenever a GPS coordinate, or every Nth GPS coordinate, becomes available to station 202;
  iii. every T units of time; or
  iv. when requested by server 204.

Furthermore, in some embodiments, station 202 transmits the unique vehicle identifier without the location in some messages and with the location in other messages. For example, station 202 might initially transmit the unique vehicle identifier without the location, and then later on, when prompted to do so, station 202 transmits the location to server 204. It will be clear to those skilled in the art, after reading this disclosure, when station 202 should transmit a unique vehicle identifier or a location or both.

At task 802, server 204 receives the unique vehicle identifier and the location, in well-known fashion.

At task 803, server 204 accesses a non-empty set (e.g., a list, etc.) of vehicle identifiers that is stored in database 205, in well-known fashion. For example, the stored list might represent stolen vehicles that have been reported to the operator of telecommunications system 200.

At task 804, server 204 determines whether the unique vehicle identifier received from station 202 matches any of the identifiers stored in database 205, in well-known fashion. If there is not a match, the procedure shown in FIG. 8 stops. If there is a match, control proceeds to task 805.

At task 805, server 204 notifies the user of telecommunications system 200, who is presumably interested in the whereabouts of vehicle 101, that vehicle 101 has been detected. In other embodiments, server 204 requests station 202 to provide the location if station 202 has not yet provided the location with the unique vehicle identifier.

Having received a unique vehicle identifier that appears on the list in database 205, server 204 notifies the user that vehicle 101 has been found at the location determined. For example, a local law enforcement agency that is trying to find vehicle 101 can use the location to close in on the vehicle. As will be appreciated by those skilled in the art, server 204 can notify the user in a variety of ways, such as by transmitting a message, sending an email, placing a phone call, using a courier, etc.

At optional task 806, server 204 transmits a message to vehicle 101 to control the vehicle. In some embodiments, it is desirable to control vehicle 101, in addition to tracking the vehicle.

At task 807, station 202 receives the control message via the shared-communications channel.

At task 808, station 202 determines the nature of the control to be applied by the control message received. For example, the control message might direct station 202 to disable the ignition system of engine 301. Station 202 then transmits corresponding control signals to engine 301 to control (e.g., disable, limit the speed of, etc.) vehicle 101. It will be clear to those skilled in the art how to map a particular received message to a corresponding, transmitted control signal or signals.

It is to be understood that the above-described embodiments are merely illustrative of the present invention and that many variations of the above-described embodiments can be devised by those skilled in the art without departing from the scope of the invention. For example, in this Specification, numerous specific details are provided in order to provide a thorough description and understanding of the illustrative embodiments of the present invention. Those skilled in the art will recognize, however, that the invention can be practiced without one or more of those details, or with other methods, materials, components, etc.

Furthermore, in some instances, well-known structures, materials, or operations are not shown or described in detail to avoid obscuring aspects of the illustrative embodiments. It is understood that the various embodiments shown in the Figures are illustrative, and are not necessarily drawn to scale. Reference throughout the specification to "one embodiment" or "an embodiment" or "some embodiments" means that a particular feature, structure, material, or characteristic described in connection with the embodiment(s) is included in at least one embodiment of the present invention, but not necessarily all embodiments. Consequently, the appearances of the phrase "in one embodiment," "in an embodiment," or "in some embodiments" in various places throughout the Specification are not necessarily all referring to the same embodiment. Furthermore, the particular features, structures, materials, or characteristics can be combined in any suitable manner in one or more embodiments. It is therefore intended that such variations be included within the scope of the following claims and their equivalents.

What is claimed is:

1. A method comprising:
  receiving a vehicle identifier associated with a vehicle, and responsively adding the vehicle identifier to a list of vehicle identifiers, wherein each of the vehicle identifiers included in the list is associated with a different vehicle requiring a location determination;
  receiving a particular vehicle identifier associated with a particular vehicle and a location of the particular vehicle via a shared-communications channel of a Dedicated Short Range Communications-based infrastructure, wherein the location of the particular vehicle is represented by a Medium Access Controller address of a wireless communications station in communication with the particular vehicle;
  comparing the particular vehicle identifier against the vehicle identifiers included in the list of vehicle identifiers; and
  transmitting the location of the particular vehicle if the particular vehicle identifier is found in the list of vehicle identifiers.

2. The method of claim 1, further comprising transmitting a control message to said wireless communications station.

3. The method of claim 2, wherein said control message comprises a command to disable the particular vehicle that is associated with said wireless communications station.

4. The method of claim 1, wherein said Dedicated Short Range Communications-based infrastructure uses an IEEE 802.2 logical link control layer.

5. A method comprising:
receiving a vehicle identifier associated with a vehicle and responsively adding the vehicle identifier to a list of vehicle identifiers requiring a location determination, wherein each of the vehicle identifiers included in the list is associated with a different vehicle;
receiving at a wireless communication station a particular vehicle identifier associated with a particular vehicle via a shared-communications channel of a Dedicated Short Range Communications-based infrastructure, and responsively transmitting to a server the particular vehicle identifier and a location of the particular vehicle, wherein the location of the particular vehicle is represented by a Medium Access Controller address of the wireless communications station in communication with the vehicle;
comparing the particular vehicle identifier against the list of vehicle identifiers; and,
transmitting a control command to the particular vehicle via the wireless communication station if the particular vehicle identifier is found in the list of vehicle identifiers.

6. The method of claim 5, wherein the control command disables said particular vehicle.

7. The method of claim 5, wherein said Dedicated Short Range Communications-based infrastructure uses an IEEE 802.2 logical link control layer.

8. The method of claim 5, wherein said shared-communications channel occupies at least a portion of a 5.85 Gigahertz to 5.925 Gigahertz electromagnetic frequency band.

9. The method of claim 5, wherein at least a portion of the vehicle identifier is based on the vehicle identification number of said vehicle.

10. The method of claim 5, wherein the transmitting of the vehicle identifier and the location occurs when said vehicle moves from a first region that is served by a first access point of said Dedicated Short Range Communications-based infrastructure to a second region that is served by a second access point of said Dedicated Short Range Communications-based infrastructure, wherein said first access point and said second access point are different.

11. The method of claim 5, wherein said location comprises Global Positioning System coordinates.

12. An apparatus comprising:
a first interface of a server for receiving a vehicle identifier, wherein the first interface responsively adds the vehicle identifier to a list of vehicle identifiers, and wherein each of the vehicle identifiers included in the list is associated with a different vehicle requiring location determination;
a second interface of the server for receiving a particular vehicle identifier and a location of a particular vehicle associated with the particular vehicle identifier, wherein the particular vehicle identifier is obtained by a wireless communication station via a shared-communications channel of a Dedicated Short Range Communications-based infrastructure, wherein the location is represented by a Medium Access Controller address of the wireless communications station in communication with the particular vehicle; and
a third interface of the server for comparing the particular vehicle identifier against the set of vehicle identifiers and transmitting the location of the particular vehicle if the particular vehicle identifier is found in the list of vehicle identifiers.

13. The apparatus of claim 12, wherein said second interface is also for transmitting a control message to said wireless communications station.

14. The apparatus of claim 13, wherein said control message comprises a command to disable the particular vehicle that is associated with said wireless communications station.

15. The apparatus of claim 12, wherein said Dedicated Short Range Communications-based infrastructure uses an IEEE 802.2 logical link control layer.

16. An apparatus comprising:
a server for receiving a request for a location of a vehicle, wherein the vehicle is associated with a vehicle identifier, wherein the server responsively adds the vehicle identifier to a list of vehicle identifiers, and wherein each of the vehicle identifiers included in the list is associated with a different vehicle requiring a location determination;
a transmitter for transmitting to the server a particular vehicle identifier and a location of a particular vehicle associated with the particular vehicle identifier, wherein the vehicle identifier is obtained via a shared-communications channel of a Dedicated Short Range Communications-based infrastructure, wherein the location is represented by a Medium Access Controller address of a wireless communications station, and wherein the server responsively compares the particular vehicle identifier against the list of vehicle identifiers;
a receiver on the particular vehicle for receiving a message via the shared-communications channel, the message based on if the particular vehicle identifier is found in the list of vehicle identifiers; and
a processor on the particular vehicle for controlling the particular vehicle based on the received message.

17. The apparatus of claim 16, wherein the controlling of the particular vehicle disables the particular vehicle.

18. The apparatus of claim 16, wherein said Dedicated Short Range Communications-based infrastructure uses an IEEE 802.2 logical link control layer.

19. The apparatus of claim 16, wherein said shared-communications channel occupies at least a portion of a 5.85 Gigahertz to 5.925 Gigahertz electromagnetic frequency band.

20. The apparatus of claim 16, wherein at least a portion of the vehicle identifier is based on the vehicle identification number of said vehicle.

21. The apparatus of claim 16, wherein the transmitting occurs when said vehicle moves from a first region that is served by a first access point to a second region that is served by a second access point of said Dedicated Short Range Communications-based infrastructure, wherein said first access point and said second access point are different.

22. The apparatus of claim 16, further comprising a Global Positioning System receiver, wherein said location comprises information that is based on signals received by said Global Positioning System receiver.

23. A motor vehicle comprising:
an engine for propelling the motor vehicle; and
a communications station for:
(a) transmitting to a server a particular vehicle identifier associated with the motor vehicle and a location of the motor vehicle via a shared-communications channel of a Dedicated Short Range Communications-based infrastructure, wherein the location of the motor vehicle is represented by a Medium Access Controller address of a wireless communications station in communication with the vehicle, wherein the server is arranged to receive a request for a location of a vehicle, wherein the vehicle is associated with a vehicle identifier, and wherein the server responsively adds the vehicle identifier to a list of vehicle identifiers requiring a location determination; and (b) controlling said engine based on a message received from the server via the shared-communications channel, wherein the server is arranged to compare the particular vehicle identifier against the list of vehicle identifiers, and wherein the message received from the server is based on if the particular vehicle identifier is found in the list of vehicle identifiers.

24. The motor vehicle of claim 23, wherein the controlling of said vehicle disables said vehicle.

25. The motor vehicle of claim 23, wherein said Dedicated Short Range Communications-based infrastructure uses an IEEE 802.2 logical link control layer.

26. The motor vehicle of claim 23, wherein at least a portion of the vehicle identifier is based on the vehicle identification number of said vehicle.

27. The motor vehicle of claim 23, further comprising a Global Positioning System receiver, wherein the location comprises information that is based on signals received by said Global Positioning System receiver.

* * * * *

UNITED STATES PATENT AND TRADEMARK OFFICE
CERTIFICATE OF CORRECTION

PATENT NO. : 7,647,165 B2
APPLICATION NO. : 10/861066
DATED : January 12, 2010
INVENTOR(S) : Godfrey et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1109 days.

Signed and Sealed this

Twenty-eighth Day of December, 2010

David J. Kappos
*Director of the United States Patent and Trademark Office*